(12) United States Patent
Feng et al.

(10) Patent No.: US 11,989,588 B2
(45) Date of Patent: May 21, 2024

(54) SHARED MEMORY MANAGEMENT METHOD AND DEVICE

(71) Applicant: INSPUR SUZHOU INTELLIGENT TECHNOLOGY CO., LTD., Jiangsu (CN)

(72) Inventors: Tangzhi Feng, Shandong (CN); Ruizhen Wu, Shandong (CN); Jian Cui, Shandong (CN); Hongbin Yu, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/025,635

(22) PCT Filed: Sep. 29, 2021

(86) PCT No.: PCT/CN2021/121876
§ 371 (c)(1),
(2) Date: Mar. 9, 2023

(87) PCT Pub. No.: WO2022/134723
PCT Pub. Date: Jun. 30, 2022

(65) Prior Publication Data
US 2023/0367637 A1 Nov. 16, 2023

(30) Foreign Application Priority Data

Dec. 25, 2020 (CN) .......................... 202011562692.0

(51) Int. Cl.
*G06F 9/50* (2006.01)
*G06F 9/54* (2006.01)
(Continued)

(52) U.S. Cl.
CPC ............ *G06F 9/5016* (2013.01); *G06F 9/544* (2013.01); *G06F 12/023* (2013.01); *G06F 12/0292* (2013.01); *G06F 2212/1016* (2013.01)

(58) Field of Classification Search
CPC .......... G06F 9/5016; G06F 9/544; G06F 9/52; G06F 9/5022; G06F 12/023;
(Continued)

(56) References Cited

U.S. PATENT DOCUMENTS

| 8,769,190 | B1 * | 7/2014 | Syu .......................... G06F 3/064 711/173 |
| 2020/0242038 | A1 * | 7/2020 | Bazarsky ............ G06F 12/0862 |
| 2020/0387405 | A1 | 12/2020 | Xiao et al. |

FOREIGN PATENT DOCUMENTS

| CN | 102184142 A | 9/2011 |
| CN | 105893269 A | 8/2016 |

(Continued)

OTHER PUBLICATIONS

PCT/CN2021/121876 international search report.

*Primary Examiner* — Khoa D Doan
(74) *Attorney, Agent, or Firm* — IPro, PLLC (57) ABSTRACT

A method for managing a shared memory, including: setting a master core, applying, by the master core, to a system for idle hugepage blocks, mapping the idle hugepage blocks to a virtual address space of the master core, and sorting the hugepage blocks in an ascending order of physical address size of the hugepage blocks; dividing, depending on whether the physical addresses are continuous, the hugepage blocks sorted into segments; in response to determining that there are segments satisfying the memory demand of the subsystem, sorting the segments satisfying the memory demand of the subsystem in a descending order of lengths thereof, and remapping the sorted segments to obtain segments having both continuous virtual addresses and continuous real
(Continued)

addresses; and in response to determine that there is a segment satisfying the memory demand of the system, releasing hugepage blocks other than the segment satisfying the memory demand of the system.

20 Claims, 2 Drawing Sheets

(51) Int. Cl.
*G06F 12/02* (2006.01)
*G06F 12/10* (2016.01)

(58) Field of Classification Search
CPC ............... G06F 12/0292; G06F 12/109; G06F 2212/1016; G06F 2212/1008; G06F 2212/1024; G06F 2212/254; G06F 2212/657; Y02D 10/00
See application file for complete search history.

(56) References Cited

FOREIGN PATENT DOCUMENTS

| CN | 111913893 A | 11/2020 |
| CN | 112612623 A | 4/2021 |

* cited by examiner

SHARED MEMORY MANAGEMENT METHOD AND DEVICE

CROSS-REFERENCE TO RELATED APPLICATION

The present application claims the priority to the Chinese patent application No. 202011562692.0, filed on Dec. 25, 2020 before the China National Intellectual Property Administration and titled "SHARED MEMORY MANAGEMENT METHOD AND DEVICE", which is incorporated herein in its entirety by reference.

TECHNICAL FIELD

The present application relates to the field of computers, and more particularly relates to a method and device for managing a shared memory.

BACKGROUND

In many software-hardware parallel processing systems based on hardware acceleration peripheral devices and multi-core general purpose processors, a complete processing process may be divided into multiple processing stages, and these processing stages may be assigned to the hardware acceleration peripheral devices or the processor cores according to the characteristics of the processing stages. The hardware acceleration peripheral devices and the multiple processor cores simultaneously process the different stages, to realize an assembly-line-style parallel processing, thereby improving the overall performance of the system. Generally, the hardware acceleration peripheral devices are suitable to process scenes involving a simple processing logic and large data traffic. Therefore, this part usually has simple control logic, but has frequent calculation and frequent interaction with the memory. The general purpose processor is convenient for software programming, and is suitable to process processes involving complicated control logic. On the software level, the processing processes may be, according to different processing stages, further divided and allocated to different processor cores, so that these cores simultaneously perform assembly-line-style parallel processing, thereby improving the processing efficiency of the software. In practical implementations, a multi-process technique, in which each of the processes is bonded to one of the processor cores, may be used, so that the system implementation can discard differences between the processors, and directly perform a multi-process encoding based on the operating system. At any moment, each of the processes merely processes a certain particular stage, the logic is relatively simple, and the software can make targeted deep optimization according to the characteristics of the present stage. Therefore, such a processing mode has the characteristics of a high reliability and a high efficiency. Because both of the processing efficiency and the flexibility are taken into consideration, such software-hardware parallel processing systems based on hardware acceleration peripheral devices and multi-core general purpose processors have the characteristics of rich usage scenes, a high performance and a high reliability. However, such system has the following two problems in terms of solutions. Firstly, the data processed at various stages is different stages of a complete datum in logical terms, and an output of a preceding stage is served as an input of a subsequent stage. Since virtual addresses and physical addresses of different cores might be different, data copying operation may exist in the cross-core flowing of the data from the preceding stage to the subsequent stage. Secondly, the use of the memory is limited. In consideration of issues of the cost and the accessing efficiency of the memory, in many application scenes, since the peripheral hardware usually does not have a memory management unit (MMU), it can merely access a memory space having continuous physical addresses. The processor usually includes the MMU, and can access a memory space having discontinuous physical addresses. Considering factors such as the flexibility, the accessing efficiency of the memory and safety, the addresses used by the software are usually virtual addresses. As limited by the memory allocating mechanism of the operating system, the allocated memory usually does not have continuous physical addresses even if it has continuous virtual addresses. In this case, a hardware-accessing abnormality might occur if the peripheral hardware accesses such space. Moreover, even though some current upscale processors, for example, some upscale Cortex-A series processors based on ARMv8 or higher kernel version and high-performance x86 (64-bit version) processors, have an MMU/IOMMU module used for peripheral devices. Through the MMU/IOMMU module, a conversion between the virtual addresses and the physical addresses can be realized when the peripheral hardware devices access the memory. However, the translation lookaside buffer (TLB) region of the IOMMU (input/output memory management unit) usually has a low capacity, a missing page interruption for the addresses easily happens in high-concurrency large-capacity data processing processes, resulting in decreasing of the processing efficiency, and affecting the throughput of the system.

In view of the above problems, at the initial designing of the system, a segment of the memory having continuous physical addresses is pre-planned to be served as a shared memory for different processing stages, and mapping relations of the physical addresses and the virtual addresses of the segment of memory on all the processor cores are planned when the system is started up. Accordingly, after one of the processes has been completed, the output data is served as the input data of the next process, and the private virtual addresses of the cores may be determined according to the private TLB tables (Address Translation Table, a conversion relation between the physical address of one block of physical memory and the virtual address thereof in a process is referred to as one TLB conversion item, where the block of physical memory is referred to as one page, and the default size of the page is 4 KB; the TLB is a set of different conversion items; the operating system manages the virtual addresses and the physical addresses of the memory in units of a page) of the cores, thereby realizing the access to the same physical address, realizing data sharing, and removing memory copying operation.

The above solution can improve the performance of the protocol stack to a certain extent, but has the following problems.

Firstly, the use of the solution is restricted because it is required to reserve a certain physical memory resource and a virtual address space in the designing of the overall system. Such resource reservation and planning are mainly used for a custom embedded system, for example, a processing unit of a base station and a dedicated server, but are not adapted for the usage scene of "board card+general purpose server". Moreover, excessive resource reservation will result in the waste of the resources, and the performance of the protocol stack will decrease or even fail if too little resource is reserved. Secondly, the data flow has a low efficiency. The conventional solution omits the data copying operation in the data flow. However, since the pre-planned block of physical memory has different conversion relations between the virtual addresses and the physical addresses on different cores, the output buffer region of the preceding stage (implemented by a single processor core) has to undergo an address conversion operation first, to convert the physical address of the shared physical memory into a virtual address space of a core (usually different from the processor core of the preceding stage) where the current processing stage is located, to facilitate the operations by the software. The address conversion requires multiple system calls, which has certain adverse affection on the software performance.

SUMMARY

In view of the above, the objective of embodiments of the present application is to provide a method and device for managing a shared memory.

In order to achieve the above object, an aspect of the embodiments of the present application provides a method for managing a shared memory, including:
  setting one core of a system to be a master core, setting remaining cores to be slave cores, and applying, by the master core, to the system for a threshold quantity of idle hugepage blocks, the hugepage being a page, the size of which is not 4 KB, for example, a page having a size of 2 MB or 1 GB, each of the blocks being a set formed by a plurality of hugepages of a single length; mapping all of the idle hugepage blocks to a virtual address space of the master core, and sorting the hugepage blocks in an ascending order of physical address size of the hugepage blocks;
  dividing, according to whether the physical addresses are continuous, the hugepage blocks sorted in the ascending order into segments, and determining whether segments satisfying a memory demand of a subsystem exist among all of segments;
  in response to determining that segments satisfying the memory demand of the subsystem exist among all of the segments, sorting the segments satisfying the memory demand of the subsystem in a descending order of lengths, and re-mapping the segments sorted to obtain several segments having both continuous intra-segment virtual addresses and continuous intra-segment physical addresses;
  in response to determining that a segment satisfying a memory demand of the system existing among the segments having both continuous intra-segment virtual addresses and continuous intra-segment physical addresses, releasing hugepage blocks other than the segment satisfying the memory demand of the system; and
  applying for a control plane shared memory, storing a virtual address of a data plane shared memory into a relevant data pointer of the control plane shared memory, setting a master-slave synchronization mark for initialization process, and starting up initialization of the slave cores based on the synchronization mark.

According to an embodiment of the present application, the applying for a control plane shared memory, storing a virtual address of a data plane shared memory into a relevant data pointer of the control plane shared memory, setting a master-slave synchronization mark for initialization process, and starting up initialization of the slave cores based on the synchronization mark, includes:
  in response to the master-slave synchronization mark for initialization process being set, applying for a named shared memory for multi-core synchronous communication and controlling, and acquiring the virtual address of the data plane shared memory from the named shared memory;
  based on a master-slave-agreed hugepage naming, opening, in a read-write form, a hugepage file created by the master core, and according to the address of the data plane shared memory, performing a specified address mapping, to perform initialization; and
  reporting, by setting the master-slave synchronization mark, to the master core an initialization result of the slave cores.

According to an embodiment of the present application, the method further includes:
  in response to determining that none of the segments satisfies the memory demand of the subsystem, releasing all of the hugepage blocks;
  applying, by the master core, to the system for 2 times of the threshold quantity of idle hugepage blocks, mapping all of the idle hugepage blocks to the virtual address space of the master core, and sorting the hugepage blocks in an ascending order of the physical address size of the hugepage blocks; and
  dividing, according to whether the physical addresses are continuous, the hugepage blocks sorted in the ascending order into segments, and determining whether segments satisfying the memory demand of the subsystem exist among all of the segments.

According to an embodiment of the present application, the re-mapping the segments sorted to obtain several segments having both continuous intra-segment virtual addresses and continuous intra-segment physical addresses includes:
  acquiring a size of the segment and a size of a single hugepage block in the segment, and opening a /dev/zero file in a read-only mode;
  mapping the opened file to a process virtual address space using an un-specified address, the size of the mapping being the size of the segment, and determining whether the mapping succeeds;
  in response to determining that the mapping succeeds, recording the address where the mapping succeeds as ADDR0, and a maximum address range currently supported; and
  closing the file, and performing a specified address re-mapping on each of the hugepage blocks in the segment.

According to an embodiment of the present application, the closing the file, and performing a specified address re-mapping on each of the hugepage blocks in the segment, includes:
  setting a specified initial mapping address to be ADDR0, a mapping length to be a size of a single hugepage block, and an initial hugepage file to be a first hugepage file in the segment;
  configuring a mapping address MAP_ADDR, a size HUGEPAGE_SIZE and the hugepage file by using the initial mapping address;
  opening the hugepage file that has been configured, and mapping the hugepage file according to the mapping address and the size HUGEPAGE_SIZE;
  updating the mapping address MAP_ADDR to be MAP_ADDR+HUGEPAGE_SIZE, and updating the hugepage file; and repeating the above steps, till both of the virtual addresses and the physical addresses of the segment are continuous.

Another aspect of the embodiments of the present application further provides a device for managing a shared memory, including:

a sorting module, configured for setting one core of a system to be a master core, and setting remaining cores to be slave cores; applying, by the master core, to the system for a threshold quantity of idle hugepage blocks, mapping all of the idle hugepage blocks to a virtual address space of the master core, and sort the hugepage blocks in an ascending order of physical address size of the hugepage blocks;

a judging module, configured for dividing, according to whether the physical addresses are continuous, the hugepage blocks sorted in the ascending order into segments, and determining whether segments satisfying a memory demand of a subsystem exist among all of the segments;

a mapping module, configured for, in response to determining that segments satisfying the memory demand of the subsystem exist among all of the segments, sorting the segments satisfying the memory demand of the subsystem in a descending order of lengths, and re-mapping the segments sorted to obtain several segments having both continuous intra-segment virtual addresses and continuous intra-segment physical addresses;

a releasing module, configured for, in response to determining that a segment satisfying a memory demand of the system exists among the several segments having both continuous intra-segment virtual addresses and continuous intra-segment physical addresses, releasing hugepage blocks other than the segment satisfying the memory demand of the system; and a starting-up module, configured for applying for a control plane shared memory, storing a virtual address of a data plane shared memory into a relevant data pointer of the control plane shared memory, setting a master-slave synchronization mark for initialization process, and starting up initialization of the slave cores based on the synchronization mark.

According to an embodiment of the present application, the starting-up module is further configured for:

in response to the master-slave synchronization mark for initialization process being set, applying for a named shared memory for multi-core synchronous communication and controlling, and acquiring the virtual address of the data plane shared memory from the named shared memory;

based on a master-slave-agreed hugepage naming, open a hugepage file created by the master core in a read-write form, and performing, according to the address of the data plane shared memory, a specified address mapping, to perform initialization; and reporting, by setting the master-slave synchronization mark, an initialization result of the slave core to the master core.

According to an embodiment of the present application, the device further includes an applying module configured for:

in response to determining that none of the segments satisfies the memory demand of the subsystem, releasing all of the hugepage blocks;

applying, by the master core, to the system for 2 times of the threshold quantity of idle hugepage blocks, mapping all of the idle hugepage blocks to the virtual address space of the master core, and sorting the hugepage blocks in an ascending order of the physical address size of the hugepage blocks; and dividing, according to whether the physical addresses are continuous, the hugepage blocks sorted in the ascending order into segments, and determining whether segments satisfying the memory demand of the subsystem exist among all of the segments.

According to an embodiment of the present application, the mapping module is further configured for:

acquiring a size of the segment and a size of a single hugepage block in the segment, and opening a /dev/zero file in a read-only mode;

mapping the opened file to a process virtual address space using an un-specifyed address, the size of the mapping being the size of the segment, and determining whether the mapping succeeds;

in response to determining that the mapping succeeds, recording the address where the mapping succeeds as ADDR0, and a maximum address range currently supported; and closing the file, and performing a specified address re-mapping on each of the hugepage blocks in the segment.

According to an embodiment of the present application, the mapping module is further configured for:

setting a specified initial mapping address to be ADDR0, a mapping length to be a size of a single hugepage block, and an initial hugepage file to be a first hugepage file in the segment;

configuring a mapping address MAP_ADDR, a size HUGEPAGE_SIZE and the hugepage file by using the initial mapping address;

opening the hugepage file that has been configured, and mapping the hugepage file according to the mapping address and the size HUGEPAGE_SIZE;

updating the mapping address MAP_ADDR to be MAP_ADDR+HUGEPAGE_SIZE, and updating the hugepage file; and repeating the above steps, till both of the virtual addresses and the physical addresses of the segment are continuous.

BRIEF DESCRIPTION OF THE DRAWINGS

In order to more clearly illustrate the technical solutions of the embodiments of the present application or the related art, the figures that are required to describe the embodiments or the related art will be briefly described below. Apparently, the figures described below are merely some embodiments of the present application, and those skilled in the art can obtain other embodiments according to these figures without paying creative work.

DETAILED DESCRIPTION

In order to make the objects, the technical solutions and the advantages of the present application clearer, the embodiments of the present application will be further described in detail with reference to the embodiments and the drawings.

Figure 1:
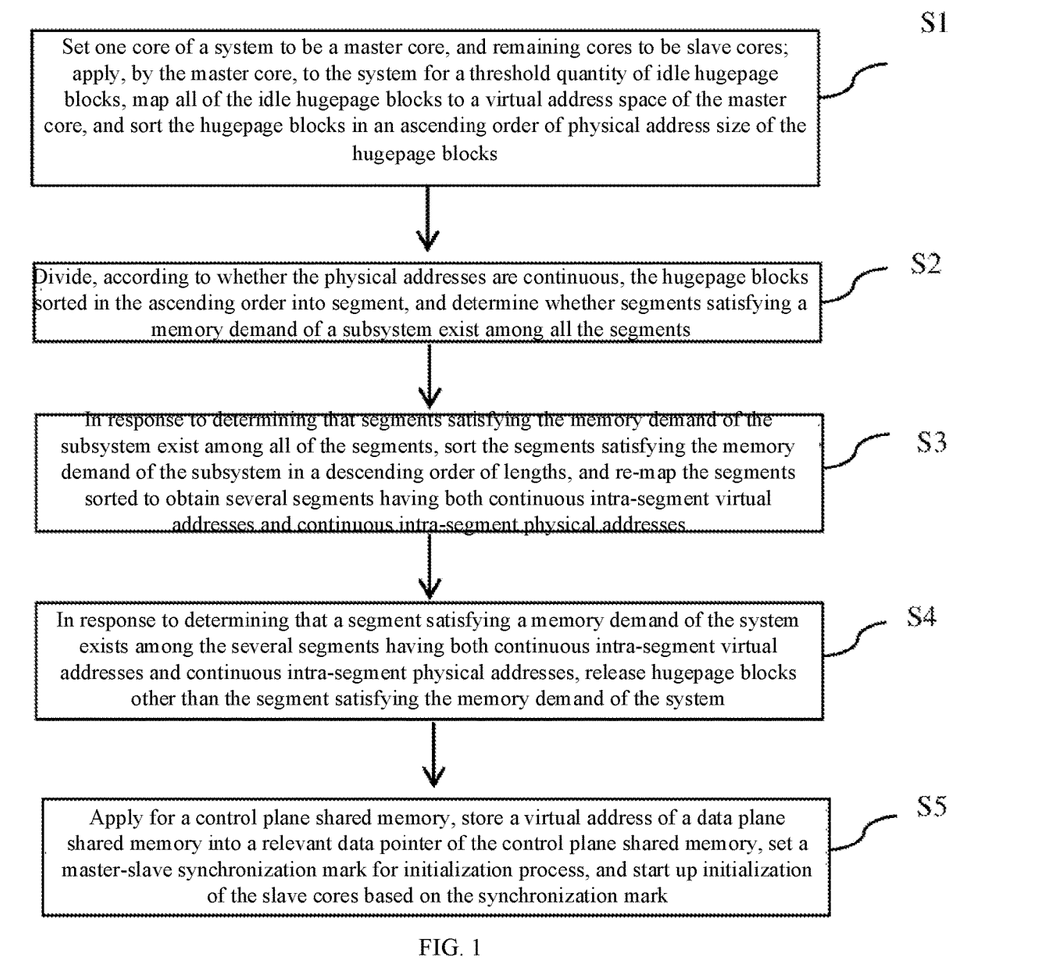
FIG. 1 is a schematic flow chart of a method for managing a shared memory according to an embodiment of the present application.

In order to achieve the above object, a first aspect of the present application provides an embodiment of a method for managing a shared memory. FIG. 1 is a schematic flow chart of the method.

As shown in FIG. 1, the method may include steps described below.

At S1, one core of a system is set as a master core, and remaining cores are set as slave cores; and the master core applies to the system for a threshold quantity of idle hugepage blocks, all the idle hugepage blocks are mapped to a virtual address space of the master core, and are sorted in an ascending order of physical address size of the hugepage blocks. According to a demand of a software-hardware parallel processing subsystem, the master core applies to the host system for sufficient idle hugepage blocks by creating a hugepage named file. Empirically, it is merely required that the sum of the memory sizes of all of the hugepage blocks is greater than 1.5 times of the memory required by the subsystem. The amount of hugepage memory that is applied for this time is recorded as HUGEPAGE_NUM. If the host system cannot satisfy HUGEPAGE_NUM, the configuration file of the host system is modified to acquire more idle hugepage memory blocks. The master core maps all of the idle hugepage memory blocks that have been applied for to the virtual address space of the master core, and sorts the hugepage memory blocks in the ascending order of the physical address size of the hugepage memory blocks.

At S2, the hugepage blocks sorted in an ascending order are divided into segments according to whether the physical addresses are continuous, and it is determined whether segments satisfying a memory demand of the subsystem exist among all of the segments. The hugepage memory blocks sorted are divided into segments according to whether the physical addresses are continuous, and hugepage memory blocks having continuous physical addresses after the division are referred to as a segment. Since all of the physical addresses of the hugepage memory blocks may not be continuous, multiple segments might be obtained after the division. It is determined whether there exists a certain segment, the size of which satisfies the memory demand of the subsystem (the size satisfies the demand, and the physical address is continuous), among those discrete segments. If there exists a certain segment, the size of which satisfies the memory demand of the subsystem, among those discrete segments, then the method enters subsequent steps. If there exists no segment, the size of which satisfies the memory demand of the subsystem, among those discrete segments, then the HUGEPAGE_NUM in the above step is modified into 2*HUGEPAGE_NUM, all of the hugepage memory blocks that have been applied for are released, and the method enters the above step to re-apply, till there exists a certain segment, the size of which satisfies the memory demand of the subsystem, among the segments.

At S3, in response to determining that segments satisfying the memory demand of the subsystem exist among the segments, the segments satisfying the memory demand of the subsystem are sorted in a descending order of lengths, and the segments sorted are re-mapped to obtain several segments having both continuous intra-segment virtual addresses and continuous intra-segment physical addresses. Since the quantity of the hugepage memory blocks that have been applied for is greater than that required by the system, multiple segments satisfying the memory demand of the system might exist among the segments obtained above. Those segments are sorted in a descending order of the lengths, and the segments sorted are re-mapped, to obtain serval segments having both continuous intra-segment virtual addresses and continuous intra-segment physical addresses. Subsequently, it is determined whether a segment satisfying the memory demand of the system exists among the obtained discrete segments (the size satisfies the demand and the virtual addresses and the physical addresses are both continuous). If a segment satisfying the memory demand of the system exists among the obtained discrete segments, then the method enters the subsequent step, and the segment satisfying the memory demand of the system is referred to as a data-plane shared memory. If no segment satisfying the memory demand of the system exists among the obtained discrete segments, then the HUGEPAGE_NUM is modified into 2*HUGEPAGE_NUM, all of the hugepage memory blocks that have been applied for are released, simultaneously all of the mapped virtual addresses are released, and the above steps are repeated.

At S4, in response to determining a segment satisfying the memory demand of the system exists among several segments having both continuous intra-segment virtual addresses and continuous intra-segment physical addresses, the hugepage blocks other than the segment satisfying the memory demand of the system are released. In the preceding steps, in order to look up the hugepage blocks having both continuous virtual addresses and continuous physical addresses, sufficient hugepage blocks have been applied for, among which some are not needed, and some do not satisfy the condition (the virtual addresses or the physical addresses are not continuous), these hugepage resources are required to be returned to the operating system, to prevent resource leakage.

At S5, a control plane shared memory is applied for, the virtual address of the data plane shared memory is stored into a relevant data pointer of the control plane shared memory, a master-slave synchronization mark for initialization process is provided, and the initialization of the slave core is started based on the synchronization mark. According to the naming agreement, it is applied for a named shared memory for multi-core synchronous communication and controlling, which is referred to as the control plane shared memory. The control plane shared memory generally contains a data pointer, which is used to indicate addresses of the to-be-processed data-buffer-region at different stages. The virtual address of the data plane shared memory is stored into a relevant data pointer of the control plane shared memory, and a master-slave initialization process synchronization mark is provided for starting up the initialization of the slave core.

The technical solutions according to the present application can enable processing schemes that can be used only in a dedicated device previously to be adapted for an existing general purpose device such as a general purpose server. Moreover, the technical solutions according to the present application can reduce a complexity in managing transferring of the shared memory among multiple cores, so that the software is simpler in terms of memory management, which is beneficial to quick iteration of products.

In some embodiments of the present application, the step, in which the control plane shared memory is applied for, the virtual address of the data plane shared memory is stored into a relevant data pointer of the control plane shared memory, the master-slave synchronization mark for initialization process is provided, and the initialization of the slave core is started, includes:

in response to the master-slave synchronization mark for initialization process being set, applying for the named shared memory for multi-core synchronous communication and controlling, and acquiring the virtual address of the data plane shared memory from the named shared memory;

based on a master-slave-agreed hugepage naming, opening, in a read-write form, a hugepage file created by the master core, and performing, according to the address of the data plane shared memory, a specified address mapping to perform initialization; and reporting, by setting the master-slave synchronization mark, an initialization result of the slave core to the master core. At any moment, the slave cores are merely required to, according to the scheduling information processing of the master core, process a certain stage of the flow. After the slave core is originally started, according to the mapping relation of the virtual addresses and the physical addresses of the shared memory in the master core, it is mapped to the virtual address space of the present slave core. Accordingly, the slave core and the master core can both access the same block of physical memory through the same virtual address, which omits the system call for the address conversion, and achieves the object of sharing the memory.

In some embodiments of the present application, the method further includes:

in response to determining that none of the segments satisfies the memory demand of the subsystem, releasing all of the hugepage blocks;

applying, by the master core, to the system for 2 times of the threshold quantity of idle hugepage blocks, mapping all of the idle hugepage blocks to the virtual address space of the master core, and sorting the hugepage blocks in an ascending order of the physical address size of the hugepage blocks; and dividing, according to whether the physical addresses are continuous, the hugepage blocks sorted in an ascending order into segments, and determining whether a segment satisfying the memory demand of the subsystem exists among all of the segments. If still none of the segments satisfies the memory demand of the subsystem, the quantity of the hugepage blocks that are applied for may be increased again, and this step may be repeated, till a certain segment the size of which satisfies the memory demand of the subsystem exists among the segments.

In some embodiments of the present application, the step, in which the segments sorted are re-mapped to obtain several segments having both continuous intra-segment virtual addresses and continuous intra-segment physical addresses, includes:

acquiring the size of the segment and the size of a single hugepage block in the segment, and opening a /dev/zero file in a read-only mode;

mapping the opened file to a process virtual address space using a non-specified address, the size of mapping being the size of the segment, and determining whether the mapping succeeds;

in response to determining that the mapping succeeds, recording the address where the mapping succeeds as ADDR0, and a maximum address range currently supported; and closing the file, and performing a specified address re-mapping on each of the hugepage blocks in the segment. If the mapping does not succeed, then the acquired size of a single hugepage block is subtracted from the mapping size, and then the mapping is performed again, till the mapping succeeds.

In some embodiments of the present application, the closing the file, and performing a specified address re-mapping on each of the hugepage blocks in the segment includes:

setting a specified initial mapping address to be ADDR0, a mapping length to be a size of a single hugepage block, and an initial hugepage file to be a first hugepage file in the segment;

configuring a mapping address MAP_ADDR, a size HUGEPAGE_SIZE and the hugepage file by using the initial mapping address;

opening the hugepage file that has been configured, and mapping the hugepage file according to the mapping address and the size;

updating the mapping address MAP_ADDR to be MAP_ADDR+HUGEPAGE_SIZE, and updating the hugepage file; and repeating the above steps, till all of the virtual addresses and the physical addresses of the segment are continuous. The re-mapping of the segment is used to test the largest continuous virtual address space supported by the current process. The worst case is that the continuity of the virtual addresses of the size of merely one hugepage block can be ensured (the operating system can ensure that both of the physical addresses and the virtual addresses of a single hugepage block are continuous), so the mapping must succeed after multiple times of circulation. Before being re-mapped, the segment is formed by a series of hugepage blocks having continuous and progressively increased physical addresses, therefore, it is merely required to sequentially traverse the files in the segment to ensure that the new segment finally generated has both continuous virtual addresses and continuous physical addresses. In a 64-bit operating system, the virtual address space is sufficiently large (the address range is 0 to $2^{64}-1$), a current physical memory of any size (for example, a current high-configuration server includes a physical memory not exceeding 1 TB, which is far less than the addressing space of a 64-bit system) can generally be mapped to the specified virtual address. If it still cannot be re-mapped to the specified address after multiple times of attempting, it may be attempted to modify the link configuration script (the lds file) of the software and close the ASLR option of the operating system.

The technical solutions according to the present application can enable processing schemes that can be used only in a dedicated device previously to be adapted for an existing general purpose device such as a general purpose server. Moreover, the technical solutions according to the present application can reduce a complexity in managing transferring of the shared memory among multiple cores, so that the software is simpler in terms of memory management, which is beneficial to quick iteration of products.

It should be noted that those skilled in the art can understand that all or some of the processes of the methods according to the above embodiments may be implemented by relative hardware according to an instruction from a computer program, the program may be stored in a computer-readable storage medium, and the program, when executed, may include the processes of the embodiments of the method stated above. The storage medium may be a diskette, an optical disk, a Read-Only Memory (ROM), a Random Access Memory (RAM) and so on. The embodiments of the computer program can reach an effect the same as or similar to those of any of the above-described process embodiments corresponding thereto.

Furthermore, the method according to the embodiments of the present application may also be implemented as a computer program executed by a CPU, and the computer program may be stored in a computer-readable storage medium. The computer program, when executed by the CPU, executes the above-described functions defined in the method according to the embodiments of the present application.

Figure 2:
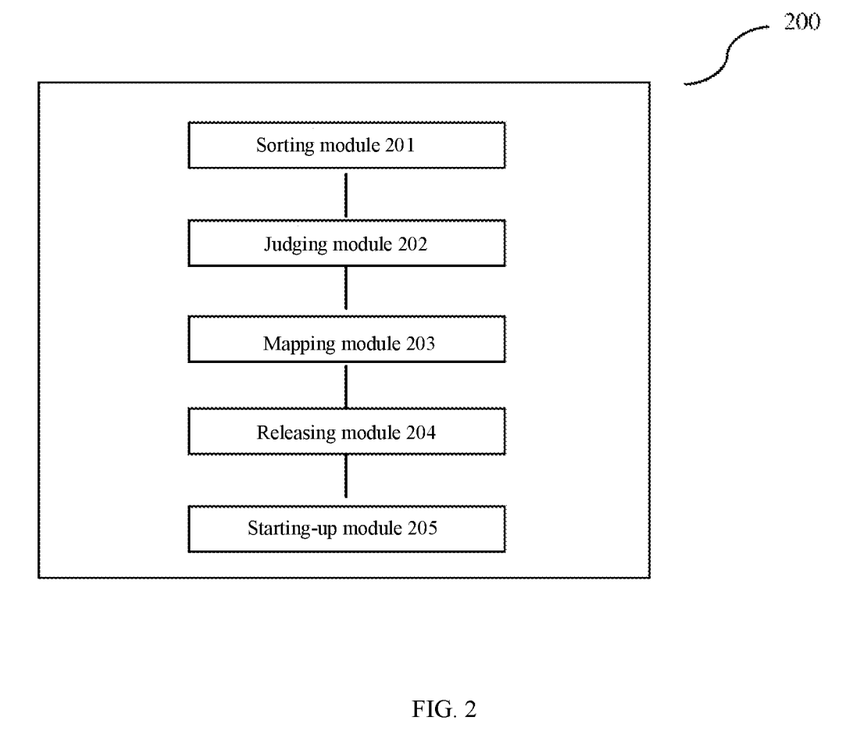
FIG. 2 is a schematic diagram of a device for managing a shared memory according to an embodiment of the present application.
Figure 3:
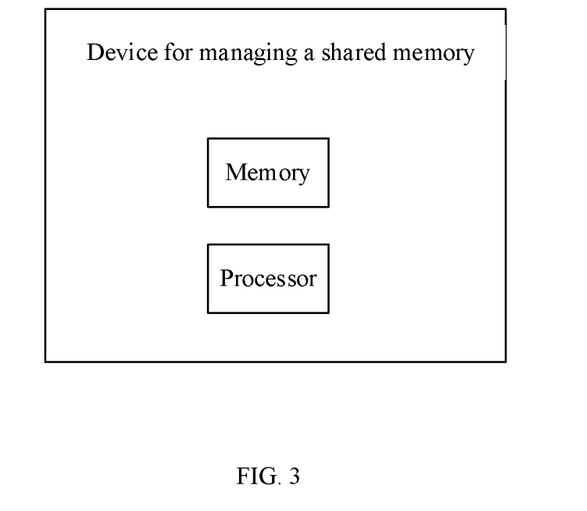
FIG. 3 is a schematic diagram of a device for managing a shared memory according to an embodiment of the present application.

In order to achieve the above object, a second aspect of the embodiments of the present application provides a device for managing a shared memory. As shown in FIG. 2, the device 200 includes a sorting module, a judging module, a mapping module, a releasing module and a starting-up module.

The sorting module is configured for setting one core of a system to be a master core, setting remaining cores to be slave cores; enablling the master core to apply to the system for a threshold quantity of idle hugepage blocks, mapping all of the idle hugepage blocks to a virtual address space of the master core, and sorting the hugepage blocks in an ascending order of physical address size of the hugepage blocks.

The judging module is configured for dividing, according to whether the physical addresses are continuous, the hugepage blocks sorted in an ascending order into segments, and determining whether segments satisfying a memory demand of a subsystem exist among all of segments.

The mapping module is configured for, in response to segments satisfying the memory demand of the subsystem existing among all of the segments, sorting the segments satisfying the memory demand of the subsystem in a descending order of lengths; and re-mapping the segments sorted to obtain several segments having both continuous intra-segment virtual addresses and continuous intra-segment physical addresses.

The releasing module is configured for, in response to a segment satisfying a memory demand of the system existing among the segments having both continuous intra-segment virtual addresses and continuous intra-segment physical addresses, releasing the hugepage blocks other than the segment satisfying the memory demand of the system.

The starting-up module is configured for applying for a control plane shared memory; storing a virtual address of a data plane shared memory into a relevant data pointer of the control plane shared memory; setting a master-slave synchronization mark for initialization processes, and starting up initialization of the slave core based on the synchronization mark.

In some embodiments of the present application, the starting-up module is further configured for:
 in response to the master-slave synchronization mark for initialization process being set, applying for a named shared memory for multi-core synchronous communication and controlling, and acquiring the virtual address of the data plane shared memory from the named shared memory;
 based on a master-slave-agreed hugepage naming, opening, in a read-write form, a hugepage file created by the master core, and performing, according to the address of the data plane shared memory, a specified address mapping to perform initialization; and
 reporting, by setting the master-slave synchronization mark, an initialization result of the slave core to the master core.

In some embodiments of the present application, the device further includes an applying module configured for:
 in response to determining that none of the segments satisfies the memory demand of the subsystem, releasing all of the hugepage blocks;
 enabling the master core to apply to the system for 2 times of the threshold quantity of idle hugepage blocks, mapping all of the idle hugepage blocks to the virtual address space of the master core, and sorting the hugepage blocks in an ascending order of the physical address size of the hugepage blocks; and
 dividing, according to whether the physical addresses are continuous, the hugepage blocks sorted in an ascending order into segments, and determining whether a segment satisfying the memory demand of the subsystem exists among all of the segments.

In some embodiments of the present application, the mapping module is further configured for:
 acquiring the size of the segment and the size of a single hugepage block in the segment, and opening a /dev/zero file in a read-only mode;
 mapping the opened file to a process virtual address space using a non-specified address, the size of mapping being the size of the segment, and determining whether the mapping succeeds;
 in response to determining that the mapping succeeds, recording the address where the mapping succeeds as ADDR0, and a maximum address range currently supported; and
 closing the file, and performing a specified address re-mapping on each of the hugepage blocks in the segment.

In some embodiments of the present application, the mapping module is further configured for:
 setting a specified initial mapping address to be ADDR0, a mapping length to be a size of a single hugepage block, and an initial hugepage file to be a first hugepage file in the segment;
 configuring a mapping address MAP_ADDR, a size HUGEPAGE_SIZE and the hugepage file by using the initial mapping address;
 opening the hugepage file that has been configured, and mapping the hugepage file according to the mapping address and the size;
 updating the mapping address MAP_ADDR to be MAP_ADDR+HUGEPAGE_SIZE, and update the hugepage file; and
 repeating the above steps, till all of the virtual addresses and the physical addresses of the segment are continuous.

The above-described embodiments, especially any "preferable" embodiment, are possible examples of the implementation, and are provided merely in order to clearly understand the principle of the present application. The above-described embodiments may be varied or modified in many modes without departing from the spirit and the principle of the technique described herein. All of the modifications are intended to be encompassed within the scope of the present disclosure and covered by the appended claims.

The invention claimed is:

1. A method for managing a shared memory, comprising:
 setting one core of a system to be a master core, and setting remaining cores to be slave cores; applying, by the master core, to the system for a threshold quantity of idle hugepage blocks, mapping all of the idle hugepage blocks to a virtual address space of the master core, and sorting the hugepage blocks in an ascending order of physical address size of the hugepage blocks;

dividing, according to whether the physical addresses are continuous, the hugepage blocks sorted in the ascending order into segments, and determining whether segments satisfying a memory demand of a subsystem exist among all of the segments;

in response to determining that segments satisfying the memory demand of the subsystem exist among all of the segments, sorting the segments satisfying the memory demand of the subsystem in a descending order of lengths, and re-mapping the segments sorted to obtain several segments having both continuous intra-segment virtual addresses and continuous intra-segment physical addresses;

in response to determining that a segment satisfying a memory demand of the system exists among the several segments having both continuous intra-segment virtual addresses and continuous intra-segment physical addresses, releasing hugepage blocks other than the segment satisfying the memory demand of the system; and applying for a control plane shared memory, storing a virtual address of a data plane shared memory into a relevant data pointer of the control plane shared memory, setting a master-slave synchronization mark for initialization process, and starting up initialization of the slave cores based on the synchronization mark.

2. The method according to claim 1, wherein the applying for a control plane shared memory, storing a virtual address of a data plane shared memory into a relevant data pointer of the control plane shared memory, setting a master-slave synchronization mark for initialization process, and starting up initialization of the slave cores based on the synchronization mark, comprises:

in response to the master-slave synchronization mark for initialization process being set, applying for a named shared memory for multi-core synchronous communication and controlling, and acquiring the virtual address of the data plane shared memory from the named shared memory;

based on a master-slave-agreed hugepage naming, opening a hugepage file created by the master core in a read-write form, and performing, according to the address of the data plane shared memory, a specified address mapping, to perform initialization; and reporting, by setting the master-slave synchronization mark, an initialization result of the slave core to the master core.

3. The method according to claim 1, further comprising:

in response to determining that none of the segments satisfies the memory demand of the subsystem, releasing all of the hugepage blocks;

enabling the master core to apply to the system for 2 times of the threshold quantity of idle hugepage blocks, mapping all of the idle hugepage blocks to the virtual address space of the master core, and sorting the hugepage blocks in an ascending order of the physical address size of the hugepage blocks; and dividing, according to whether the physical addresses are continuous, the hugepage blocks sorted in the ascending order into segments, and determining whether segments satisfying the memory demand of the subsystem exist among all of the segments.

4. The method according to claim 1, wherein the re-mapping the segments sorted to obtain several segments having both continuous intra-segment virtual addresses and continuous intra-segment physical addresses comprises:

acquiring a size of the segment and a size of a single hugepage block in the segment, and opening a /dev/zero file in a read-only mode;

mapping the opened file to a process virtual address space using a specifyed address, wherein the size of the mapping is the size of the segment, and determining whether the mapping succeeds;

in response to determining that the mapping succeeds, recording the address where the mapping succeeds as ADDR0, and a maximum address range currently supported; and closing the file, and performing a specified address re-mapping on each of the hugepage blocks in the segment.

5. The method according to claim 4, wherein the closing the file, and performing a specified address re-mapping on each of the hugepage blocks in the segment comprises:

setting a specified initial mapping address to be ADDR0, a mapping length to be a size of a single hugepage block, and an initial hugepage file to be a first hugepage file in the segment;

configuring a mapping address MAP_ADDR, a size HUGEPAGE_SIZE and the hugepage file by using the initial mapping address;

opening the hugepage file that has been configured, and mapping the hugepage file according to the mapping address and the size HUGEPAGE_SIZE;

updating the mapping address MAP_ADDR to be MAP_ADDR+HUGEPAGE_SIZE, and updating the hugepage file; and repeating the above steps, till both of the virtual addresses and the physical addresses of the segment are continuous.

6. A device for managing a shared memory, comprising:
a memory configured to store a computer program; and
a processor, wherein the computer program, when executed by the processor, causes the processor to perform operations of:

setting one core of a system to be a master core, and setting remaining cores to be slave cores; applying, by the master core, to the system for a threshold quantity of idle hugepage blocks, mapping all of the idle hugepage blocks to a virtual address space of the master core, and sorting the hugepage blocks in an ascending order of physical address size of the hugepage blocks;

dividing, according to whether the physical addresses are continuous, the hugepage blocks sorted in the ascending order into segments, and determining whether segments satisfying a memory demand of a subsystem exist among all of the segments;

in response to determining that segments satisfying the memory demand of the subsystem exist among all of the segments, sorting the segments satisfying the memory demand of the subsystem in a descending order of lengths, and re-mapping the segments sorted to obtain several segments having both continuous intra-segment virtual addresses and continuous intra-segment physical addresses;

in response to determining that a segment satisfying a memory demand of the system exists among the several segments having both continuous intra-segment virtual addresses and continuous intra-segment physical addresses, releasing hugepage blocks other than the segment satisfying the memory demand of the system; and applying for a control plane shared memory, storing a virtual address of a data plane shared memory into a relevant data pointer of the control plane shared memory, setting a master-slave synchronization mark for initialization process, and starting up initialization of the slave cores based on the synchronization mark.

7. The device according to claim 6, wherein the processor is further configured for:
in response to the master-slave synchronization mark for initialization process being set, applying for a named shared memory for multi-core synchronous communication and controlling, and acquiring the virtual address of the data plane shared memory from the named shared memory;
based on a master-slave-agreed hugepage naming, opening a hugepage file created by the master core in a read-write form, and performing, according to the address of the data plane shared memory, a specified address mapping, to perform initialization; and
reporting, by setting the master-slave synchronization mark, an initialization result of the slave core to the master core.

8. The device according to claim 6, wherein the processor is further configured for:
in response to determining that none of the segments satisfies the memory demand of the subsystem, releasing all of the hugepage blocks;
applying, by the master core, to the system for 2 times of the threshold quantity of idle hugepage blocks, mapping all of the idle hugepage blocks to the virtual address space of the master core, and sorting the hugepage blocks in an ascending order of the physical address size of the hugepage blocks; and
dividing, according to whether the physical addresses are continuous, the hugepage blocks sorted in the ascending order into segments, and determining whether segments satisfying the memory demand of the subsystem exist among all of the segments.

9. The device according to claim 6, wherein the processor is further configured for:
acquiring a size of the segment and a size of a single hugepage block in the segment, and opening a /dev/zero file in a read-only mode;
mapping the opened file to a process virtual address space using a specifyed address, wherein the size of the mapping is the size of the segment, and determining whether the mapping succeeds;
in response to determining that the mapping succeeds, recording the address where the mapping succeeds as ADDR0, and a maximum address range currently supported; and
closing the file, and performing a specified address re-mapping on each of the hugepage blocks in the segment.

10. The device according to claim 9, wherein the processor is further configured for:
setting a specified initial mapping address to be ADDR0, a mapping length to be a size of a single hugepage block, and an initial hugepage file to be a first hugepage file in the segment;
configuring a mapping address MAP_ADDR, a size HUGEPAGE_SIZE and the hugepage file by using the initial mapping address;
opening the hugepage file that has been configured, and mapping the hugepage file according to the mapping address and the size HUGEPAGE_SIZE;
updating the mapping address MAP_ADDR to be MAP_ADDR+HUGEPAGE_SIZE, and updating the hugepage file; and
repeating the above steps, till both of the virtual addresses and the physical addresses of the segment are continuous.

11. The method according to claim 1, wherein the applying, by the master core, to the system for a threshold quantity of idle hugepage blocks comprises:
applying, by the master core, to a host system for sufficient idle hugepage blocks by creating a hugepage named file.

12. The method according to claim 1, wherein a sum of the memory sizes of all of the hugepage blocks is greater than 1.5 times of the memory required by the subsystem.

13. The method according to claim 1, wherein the segment comprises hugepage blocks having continuous physical addresses.

14. The method according to claim 1, wherein the segment satisfying the memory demand of the system is a data plane shared memory.

15. The method according to claim 1, wherein the data pointer of the control plane shared memory is used for indicating addresses of a to-be-processed data-buffer-region at different stages.

16. The device according to claim 6, wherein the applying, by the master core, to the system for a threshold quantity of idle hugepage blocks comprises:
applying, by the master core, to a host system for sufficient idle hugepage blocks by creating a hugepage named file.

17. The device according to claim 6, wherein a sum of the memory sizes of all of the hugepage blocks is greater than 1.5 times of the memory required by the subsystem.

18. The device according to claim 6, wherein the segment comprises hugepage blocks having continuous physical addresses.

19. The device according to claim 6, wherein the segment satisfying the memory demand of the system is a data plane shared memory.

20. A non-transient computer-readable storage medium, wherein the computer-readable storage medium is stored with a program for managing a shared memory that, when executed by a processor, causes the processor to perform operations of:
setting one core of a system to be a master core, and setting remaining cores to be slave cores; applying, by the master core, to the system for a threshold quantity of idle hugepage blocks, mapping all of the idle hugepage blocks to a virtual address space of the master core, and sorting the hugepage blocks in an ascending order of physical address size of the hugepage blocks;
dividing, according to whether the physical addresses are continuous, the hugepage blocks sorted in the ascending order into segments, and determining whether segments satisfying a memory demand of a subsystem exist among all of the segments;
in response to determining that segments satisfying the memory demand of the subsystem exist among all of the segments, sorting the segments satisfying the memory demand of the subsystem in a descending order of lengths, and re-mapping the segments sorted to obtain several segments having both continuous intra-segment virtual addresses and continuous intra-segment physical addresses;
in response to determining that a segment satisfying a memory demand of the system exists among the several segments having both continuous intra-segment virtual addresses and continuous intra-segment physical addresses, releasing hugepage blocks other than the segment satisfying the memory demand of the system; and applying for a control plane shared memory, storing a virtual address of a data plane shared memory into a relevant data pointer of the control plane shared memory, setting a master-slave synchronization mark for initialization process, and starting up initialization of the slave cores based on the synchronization mark.

\* \* \* \* \*